US012794979B2

(12) United States Patent
Belkar et al.

(10) Patent No.: US 12,794,979 B2
(45) Date of Patent: Nov. 10, 2026

(54) DEVICE AND METHOD FOR REMOTE DIRECT MEMORY ACCESS

(71) Applicant: HUAWEI TECHNOLOGIES CO., LTD., Shenzhen (CN)

(72) Inventors: Ben-Shahar Belkar, Hod Hasharon (IL); Reuven Cohen, Hod Hasharon (IL); David Ganor, Hod Hasharon (IL); Amit Geron, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 241 days.

(21) Appl. No.: 18/439,289

(22) Filed: Feb. 12, 2024

(65) Prior Publication Data

US 2024/0187482 A1 Jun. 6, 2024

Related U.S. Application Data

(63) Continuation of application No. PCT/EP2021/072460, filed on Aug. 12, 2021.

(51) Int. Cl.
*H04L 12/24* (2006.01)
*H04L 41/0803* (2022.01)
*H04L 67/1097* (2022.01)

(52) U.S. Cl.
CPC ................................ *H04L 67/1097* (2013.01)

(58) Field of Classification Search
CPC . H04L 67/1097; G06F 13/28; G06F 15/17331
(Continued)

(56) References Cited

U.S. PATENT DOCUMENTS 6,721,806 B2 * 4/2004 Boyd .................. G06F 11/2005 714/E11.078
7,346,707 B1 * 3/2008 Erimli ..................... G06F 13/28 709/212

(Continued)

FOREIGN PATENT DOCUMENTS

WO 2023011712 A1 2/2023

OTHER PUBLICATIONS

Recio et al., "A Remote Direct Memory Access Protocol Specification," Network Working Group, Request for Comments: 5040, total 66 pages (Oct. 2007).

(Continued)

*Primary Examiner* — Lance Leonard Barry
*Assistant Examiner* — Elizabeth Kassa
(74) *Attorney, Agent, or Firm* — Leydig, Voit & Mayer, Ltd.

(57) ABSTRACT

A transmitting device and a receiving device are provided. The transmitting device is configured to: maintain a send queue, wherein the send queue comprises one or more WQEs, each WQE comprising destination information of the WQE; assign each of the one or more WQEs with an XID, and translate each WQE into a respective packet, wherein each respective packet comprises the XID of the corresponding WQE and is associated with a PSN; transmit each packet to the receiving device of the destination information of the WQE; and receive a notification message indicating whether the transmitted packet is received, for each transmitted packet from the receiving device; determine whether or not to generate a completion for each WQE, based on the notification message, on information carried in the WQE and information held by the transmitting device.

35 Claims, 10 Drawing Sheets

(58) Field of Classification Search
USPC .......................................................... 709/238
See application file for complete search history.

(56) References Cited

U.S. PATENT DOCUMENTS

| | | | | |
|---|---|---|---|---|
| 8,213,315 | B2 | 7/2012 | Crupnicoff et al. | |
| 9,985,903 | B2 | 5/2018 | Shalev et al. | |
| 2003/0091055 | A1* | 5/2003 | Craddock | H04L 49/9057 370/400 |
| 2004/0049580 | A1* | 3/2004 | Boyd | H04L 69/12 709/242 |
| 2009/0106771 | A1* | 4/2009 | Benner | G06F 12/1466 719/313 |
| 2011/0116512 | A1* | 5/2011 | Crupnicoff | H04L 67/14 370/463 |
| 2013/0111000 | A1* | 5/2013 | Kravitz | G06F 9/4881 709/223 |
| 2016/0026605 | A1* | 1/2016 | Pandit | G06F 15/17331 709/212 |
| 2017/0187496 | A1* | 6/2017 | Shalev | G06F 15/17331 |
| 2017/0187846 | A1* | 6/2017 | Shalev | G06F 15/17331 |
| 2017/0346742 | A1* | 11/2017 | Shahar | H04L 1/1635 |
| 2020/0151137 | A1* | 5/2020 | Izenberg | H04L 67/1097 |
| 2020/0334195 | A1* | 10/2020 | Chen | H04L 69/14 |

OTHER PUBLICATIONS

"Supplement to InfiniBand™ Architecture Specification vol. 1 Release 1.2.1," Annex A17: RoCEv2, total 23 pages (Sep. 2, 2014).
"InfiniBand™ Architecture Specification vol. 1 Release 1.2.1.," Final Release, total 1727 pages (Nov. 2007).
"InfiniBand™ Architecture Release 1.8, vol. 1—General Specifications," Annex A16: RDMA over Converged Ethernet (ROCE), total 17 pages (Aug. 31, 2023).

* cited by examiner

DEVICE AND METHOD FOR REMOTE DIRECT MEMORY ACCESS

CROSS-REFERENCE TO RELATED APPLICATIONS

This application is a continuation of International Application No. PCT/EP2021/072460, filed on Aug. 12, 2021, the disclosure of which is hereby incorporated by reference in its entirety.

TECHNICAL FIELD

Embodiments of the present disclosure relate to high-performance computing technologies, in particular, to Remote Direct Memory Access (RDMA) technologies. The disclosure is concerned with transporting RDMA transactions over a packet-based network. To this end, embodiments of the present disclosure provide a device, a method, and a data packet format for RDMA.

BACKGROUND

Applications often require a computer to be able to access a memory that resides on a remote computer. RDMA allows a computer to perform such memory access operations without involving the operating system that runs on the computer. RDMA is becoming widely used in modern data centers and by computer clusters as it provides low-latency remote operations together with high network bandwidth. RDMA offloads memory operations from the Central Processing Unit (CPU) to the RDMA network interface card (NIC) (RNIC), which can directly access the memory.

There are two common RDMA technologies: one that was defined in the InfiniBand specification, and another that was defined by the Internet Engineering Task Force (IETF). The IETF protocol is also referred to as iWARP (Internet Wide Area RDMA Protocol). Specifically, InfiniBand RDMA has two variants that allow it to run over IP/Ethernet networks, e.g., RoCE, and RoCEv2.

Both RDMA technologies define operations as software-layer "verbs", which are then transformed to work requests posted to the RNIC's queues. Such a work request is called a work queue element (WQE). RDMA also defines various transports, over which RDMA verbs are executed. The transports are either reliable or unreliable, in which the software is responsible for retransmission of lost packets, and connection-oriented or datagram-oriented. The various transports are indicated when a pair of network nodes establish an RDMA communication channel designated by a queue pair (QP). All current RDMA transports provide a software programming model in which operations are signaled as completed in the order (in time) in which the software layer posted them.

Today, RDMA technologies do not support a reliable transport service that can manage short messages multiplexed from multiple sources or towards multiple destinations. In the context of this application. "reliable transport" means that a message is guaranteed to be exchanged exactly once, and "short messages" means that an operation's maximum data length is a Maximum Transfer Unit (MTU) of the network. Therefore, a new reliable RDMA transport solution for processing messages up to the length of a single packet is desired.

SUMMARY

In view of the above, devices and methods of the disclosure aim to provide a device and a method for RDMA. An objective is to propose a new reliable RDMA transport for short messages, and in particular, enables the out-of-order processing for the short messages. One aim is to allow each message to be executed without dependence on previous or later operations. Another aim is to provide a solution for multiplexing RDMA operations from different source upper-layer processes or protocols (ULPs), towards multiple destinations.

A first aspect of the present disclosure provides a transmitting device for RDMA. The transmitting device is configured to: maintain a send queue, wherein the send queue comprises one or more WQEs, wherein each WQE comprises destination information of the WQE, wherein the destination information comprises at least one of: an address of a receiving device, an identifier of a receiving device, and an identifier of a target application of a receiving device: assign each of the one or more WQEs with a transaction identifier (XID), and translate each WQE into a respective packet, wherein each respective packet comprises the XID of the corresponding WQE and is associated with a packet sequence number (PSN): transmit each packet to the receiving device of the destination information of the WQE: and receive a notification message for each transmitted packet from the receiving device, wherein the notification message indicates whether the transmitted packet is received at the receiving device: determine whether or not to generate a completion for each WQE, based on the notification message, on information carried in the WQE and information held by the transmitting device.

For example, a WQE is an RDMA operation or transaction that is posted or issued by a source ULP (e.g., an application or software), and pushed into a QP. The WQE is either to be transmitted to the peer or is received from the peer. The QP represents a communication endpoint, which consists of a SEND queue (SQ) and a Receive Queue (RQ), or a shared Receive Queue (SRQ). According to this disclosure a solution is provided that allows each WQE or each message to be processed independently. i.e., to be executed without dependence on previous or later operations. Every WQE includes its own destination information (e.g. target ID, destination IP address, etc.), thus enabling the transmitting device of the first aspect to process multiple consecutive WQEs, each may be destined to a different target. Each WQE is associated with a unique XID, which can be used by the receiving side to detect duplicate operations and to guarantee that a message is to be exchanged exactly once.

The transmitting device may decide whether to signal a WQE as completed, based on certain circumstances. Conventionally. RDMA QPs always generate a completion on some opcodes (RQ processing, etc.). There is no control to manipulate a conditional completion. According to this disclosure, completions may be configurable.

In an implementation form of the first aspect, each WQE carries a message that is limited to fit in a single network maximum transmission unit.

In particular, this disclosure proposes a new reliable RDMA transport solution for processing messages up to the length of a single packet, that is, short messages.

In an implementation form of the first aspect, when the WQE corresponding to a respective packet comprises a Write operation request or a Send operation request, and the notification message indicates that the respective packet is received at the receiving device, the transmitting device is further configured to determine that the WQE is completed successfully.

RDMA operations comprise Read. Write. Send. Receive. Atomic, etc. For a Write operation or Send operation, for example, once the receiving device acknowledges the receiving of the corresponding packet, the transmitting device considers the Write operation or the Send operation is completed successfully.

In an implementation form of the first aspect, when the WQE corresponding to a respective packet comprises a Read operation request or an ATOMIC operation request, the transmitting device is further configured to: receive, as an Atomic operation response or a Read operation response to the Atomic operation request or the Read operation request, respectively, a response packet indicating that the respective packet has been processed by the receiving device, wherein the response packet comprises an XID of a response WQE and the XID of the WQE that comprises the Read operation request or the ATOMIC operation request: and determine that the WQE is completed successfully.

For a Read operation or ATOMIC operation, for example, the transmitting device further expects a Read operation response or an ATOMIC operation response from the receiving device. That is, a Read/ATOMIC WQE is not completed when the receiving device acknowledges the receiving of the corresponding packet, but only when an appropriate response packet is received by the transmitting device. In this case, the receiving device operates accordingly to provide a response packet carrying the required data. For instance, the Read operation response contains data that the transmitting device intended to fetch from the receiving device. According to this disclosure, the response packet carries the XID of a response WQE that is translated into the response packet, and also the XID of the WQE corresponding to the operation request. It should be noted that in such a case, the receiving device may also be considered as a "transmitting device" that sends a packet carrying a WQE.

In an implementation form of the first aspect, obtain a maximum number of acceptable receive timeout that is associated with the receiving device; and determine that the WQE corresponding to the respective packet is completed with error, when a number of receive timeouts exceed the maximum number of acceptable receive timeout.

Optionally, the service transport according to this disclosure includes thresholds for signaling network-related error conditions. For example, the receive timeout may also be named as the retransmission timeout. For instance, when a packet (carrying the same WQE) has been retransmitted too many times, e.g., exceeds the maximum acceptable number of retransmissions, the transmitting device stops the retransmission and determines that WQE being completed with error.

In an implementation form of the first aspect, the notification message for each transmitted packet comprises a receiver not ready (RNR) indication, wherein the RNR indication indicates that the receiving device cannot process the transmitted packet, wherein the transmitting device is further configured to: determine an XID comprised in the transmitted packet: and postpone transmitting another packet comprising the same XID before a timeout value expires.

This disclosure proposes an RNR signal for delaying the transmission of further messages. In particular, when a received packet carrying a message that temporarily cannot be processed by the receiving device, the transmitting device receives the RNR indication. RNR signal affects only the specific message, at the transmitting device, avoiding any "Head-of-Line" (HoL) blocking.

In an implementation form of the first aspect, the WQE further includes a parameter indicating a maximum number of acceptable RNR indications, wherein the transmitting device is further configured to: receive a further notification message that comprises an RNR indication for the retransmitted packet: and determine that the WQE corresponding to the retransmitted packet is completed with error, when a number of received RNR indications exceeds the maximum number of acceptable RNR indications.

Thus, the transmitting device is implicitly informed of the error of completion of the WQE.

In an implementation form of the first aspect, the notification message comprises a plurality of RNR indications, each RNR indication indicating that the receiving device cannot process a particular transmitted packet.

Possibly, there may be more than one message that the receiving device temporarily cannot process, for instance, if the receiving device does not have available resources.

In an implementation form of the first aspect, the RNR indication further indicates the timeout value.

Possibly, only a limited number of RNR timeout values is defined, to maintain overall low completion latency and to reduce the number of required timers.

In an implementation form of the first aspect, each RNR indication further indicates that the receiving device cannot process a particular transmitted packet within a particular timeout value.

Possibly, for different messages, different timeout values may be set.

In an implementation form of the first aspect, the transmitting device is further configured to manage WQEs corresponding to transmitted packets for which an RNR indication is received, based on the timeout values indicated by the RNR indications.

Optionally, the transmitting device may group the delayed WQEs in RNR "state" according to the received RNR timeout value. According to this disclosure, When a WQE is in RNR state, it means that an RNR indication is received for that WQE. WQEs in RNR "state" may be managed together by the transmitting device.

In an implementation form of the first aspect, a number of supported timeout values are configurable and agreed upon on all communication devices.

In an implementation form of the first aspect, the one or more WQEs of the send queue comprises a first WQE and a second WQE, wherein the first WQE and the second WQE comprise different destination information.

According to this disclosure a solution is proposed that can manage WQEs towards different destination nodes, e.g., different receiving nodes.

In an implementation form of the first aspect, wherein the one or more WQEs of the send queue comprises a set of WQEs comprising the same destination information, and wherein the transmitting device is further configured to: group the packets corresponding to the set of WQEs into a stream of packets: and transmit the stream of packets to the receiving device of the set of WQEs.

For example, each WQE includes its own destination information. For WQEs sharing the same destination node, packets corresponding to such WQEs may be grouped into a stream of packets and managed together by the transmitting device.

In an implementation form of the first aspect, each WQE is further associated with a priority for being transmitted from the transmitting device.

The transmitting device may configure the priorities for the WQEs that are going to be transmitted. The WQE with a higher priority may be handled before a WQE with a lower priority.

In an implementation form of the first aspect, the transmitting device is further configured to obtain the one or more WQEs from at least one ULP.

Possibly, messages or WQEs handled by the transmitting device may be posted or issued by different source ULPs.

In an implementation form of the first aspect, the set of WQEs comprising the same destination information are obtained from different ULPs.

For instance, when WQEs obtained from different source ULPs share the same destination, packets corresponding to such WQEs may be grouped into a stream of packets and transmitted together. In this way, WQEs from different sources are multiplexed.

In an implementation form of the first aspect. XIDs for WQEs obtained from different ULPs are assigned from a same XID pool, and PSNs for packets associated with the WQEs obtained from different ULPs are assigned from a same PSN pool.

Optionally, the transmitting device may maintain continuous number spaces for XIDs and for PSNs, respectively.

In an implementation form of the first aspect, the priority of each WQE is determined based on the ULP from which that WQE is obtained.

For example, WQEs or tasks posted from certain ULPs may have higher priority over other WQEs.

In an implementation form of the first aspect, each packet is further associated with a flowlet ID identifying a flowlet, wherein the flowlet comprises a plurality of packets, and the packet corresponding to the WQE further comprises the flowlet ID.

According to embodiments of this disclosure, Equal Cost Multiple Paths (ECMP) flowlets can also be applied. ECMP flowlets are (relatively easily) supported by dividing a stream of packets between an initiator node and a target node into sub-streams. Packets of different sub-streams are assumed to traverse the network using a different route.

In an implementation form of the first aspect, the transmitting device is further configured to transmit each packet to the receiving device via the flowlet, wherein the flowlet is associated with the receiving device.

For each transmitting packet associated with a particular flowlet ID, it is routed via the flowlet that can be identified by that flowlet ID.

A second aspect of the present disclosure provides a receiving device for RDMA, wherein the receiving device is configured to: receive one or more packets from a transmitting device for RDMA, wherein each packet of the one or more packets is associated with a PSN, and comprises an XID, of a corresponding WQE, wherein each WQE comprises destination information of the WQE, wherein the destination information comprises at least one of: an address of the receiving device, an identifier of the receiving device, and an identifier of a target application of a receiving device: and transmit a notification message to the transmitting device, wherein the notification message indicates that the one or more packets are received at the receiving device.

According to embodiments of this disclosure, a receiving device is provided that operates accordingly to the transmitting device of the first aspect. The receiving device proposed in this disclosure treats each received packet independently. That is, each received packet can be safely executed when it is received, regardless of the state of any previous packet.

In an implementation form of the second aspect, when the WQE corresponding to a respective packet comprises a Write operation request or a Send operation request, the receiving device is further configured to: place data, which is carried on the Write operation request, into a destination memory location in the receiving device: or place data, which is carried on the Send operation request, into a buffer from a receive queue of the receiving device.

For example, for a Write operation or Send operation, the receiving device places the data carried in the packet accordingly.

In an implementation form of the second aspect, when the WQE corresponding to a respective packet comprises a Read operation request or an ATOMIC operation request, the receiving device is further configured to transmit a response packet indicating that the respective packet has been processed by the receiving device, to the transmitting device.

For example, for a Read operation or ATOMIC operation, the receiving device operates accordingly to provide a response packet carrying the required data. For instance, the Read operation response contains data that the transmitting device intended to fetch from the receiving device.

In an implementation form of the second aspect, the receiving device is further configured to: create a response WQE according to the Read operation request or the ATOMIC operation request: and assign the response WQE with an XID and translate the response WQE into the response packet, wherein the response packet comprises the XID of the response WQE and the XID of the WQE that comprises the Read operation request or the ATOMIC operation request.

Accordingly, the receiving device generates a response WQE for the Read operation or ATOMIC operation request. It should be noted that in such a case, the receiving device may be considered as a "transmitting device" as described in the first aspect, which assigns a response WQE with an XID, translates the WQE into a packet and further sends the packet. A difference of the response packet from a "normal" transmitted packet is that the response packet further carries the XID of the WQE corresponding to the operation request, e.g., the transmitted packet. That is, two XIDs are carried in the response packet.

In an implementation form of the second aspect, the receiving device is further configured to: generate an RNR indication for a received packet, when the receiving device cannot process the respective packet, wherein the notification message for the respective packet further comprises the RNR indication indicating the transmitting device that the receiving device cannot process the respective packet.

As previously mentioned, this disclosure proposes an RNR signal for delaying the transmission of further messages. In particular, the receiving device temporarily cannot process a received packet carrying a message, for instance, if the receiving device does not have available resources, it sends the RNR indication. RNR signal affects only the specific message, at the transmitting device, avoiding any HoL blocking.

In an implementation form of the second aspect, the RNR indication further indicates a preset timeout value, wherein the RNR indication indicates that the receiving device cannot process the respective packet within the preset timeout value.

In an implementation form of the second aspect, the notification message comprises a plurality of RNR indications, each RNR indication indicating that the receiving device cannot process a particular transmitted packet.

In an implementation form of the second aspect, the one or more packets comprise a first packet and a second packet, wherein a PSN of the first packet is smaller than a PSN of the second packet, and wherein the receiving device is further configured to: transmit the notification message for the first packet and the notification message for the second packet out-of-order; and/or process the first packet and the second packet out-of-order: and transmit the response message for the first packet and the response message for the second packet to the transmitting device out-of-order.

Embodiments of this disclosure propose a new solution that enables the receiving device to execute the received packets out-of-out. Accordingly, acknowledgments (ACKs) of the reception of the packets, e.g., the notification messages, can also be transmitted out-of-out. Similarly, the responses can also be transmitted out-of-out.

In an implementation form of the second aspect, the receiving device is further configured to maintain a database storing XIDs of WQEs that are received at the receiving device.

The receiving device may record the XIDs carried in the received packets.

In an implementation form of the second aspect, the receiving device is further configured to: determine for each received packet whether it is a duplicated packet, by checking whether an XID of WQE comprised in the received packet has been stored in the database; and ignore any duplicated packet.

To avoid executing the same WQE more than once, the receiving device checks the XIDs stored in the database. When an XID carried in a newly received packet has been stored in the database, the receiving device ignores that packet instead of executing it. In this way, it can be assured that a message will be executed exactly once.

In an implementation form of the second aspect, the database further comprises a state of each WQE that indicates whether the WQE has been processed.

A third aspect of the present disclosure provides a method for RDMA. The method comprises: maintaining a send queue, wherein the send queue comprises one or more WQEs, wherein each WQE comprises destination information of the WQE, wherein the destination information comprises at least one of: an address of a receiving device, an identifier of a receiving device, and an identifier of a target application of the receiving device: assigning each of the one or more WQEs with a XID, and translate each WQE into a packet, wherein each packet comprises the XID of the corresponding WQE and is associated with a PSN; transmitting each packet to the receiving device of the destination information of the WQE; receiving a notification message for each transmitted packet from the receiving device, wherein the notification message indicates whether the transmitted packet is received at the receiving device: and determining whether to generate a completion for each WQE, based on the notification message, on information carried in the WQE and information held by the transmitting device.

The method of the third aspect and its implementation forms provide the same advantages and effects as described above for the transmitting device of the first aspect and its respective implementation forms.

A fourth aspect of the present disclosure provides a method for RDMA. The method comprises: receiving one or more packets from a transmitting device for RDMA, wherein each packet of the one or more packets is associated with a PSN, and comprises an XID, of a corresponding WQE, wherein each WQE comprises destination information of the WQE, wherein the destination information comprises at least one of: an address of the receiving device, an identifier of the receiving device, and an identifier of a target application of the receiving device: and transmitting a notification message to the transmitting device, wherein the notification message indicates that the one or more packets are received and/or processed at the receiving device.

The method of the fourth aspect and its implementation forms provide the same advantages and effects as described above for the receiving device of the second aspect and its respective implementation forms.

A fifth aspect of the present disclosure provides a computer program comprising a program code for carrying out, when implemented on a processor, the method according to any of the third aspect and its implementation forms, or any of the fourth aspect and its implementation forms.

It is noted that all devices, elements, units, and means described in the present application could be implemented in the software or hardware elements or any kind of combination thereof. All steps which are performed by the various entities described in the present application as well as the functionalities described to be performed by the various entities are intended to mean that the respective transmitting device is adapted to or configured to perform the respective steps and functionalities. Even if, in the following description of embodiments, a functionality or step to be performed by external entities is not reflected in the description of a detailed element of that transmitting device that performs that step or functionality, it should be clear for a skilled person that these methods and functionalities can be implemented in respective software or hardware elements, or any kind of combination thereof.

BRIEF DESCRIPTION OF DRAWINGS

The above described aspects and implementation forms will be explained in the following description of embodiments in relation to the enclosed drawings, in which.

DETAILED DESCRIPTION OF EMBODIMENTS

Embodiments of method, device, and program product for short message processing in an RDMA system are described with reference to the figures. The detailed examples of possible implementations are intended to be exemplary and in no way limit the scope of the application.

Moreover, an embodiment may refer to other embodiments. For example, any description including but not limited to terminology, element, process, explanation and/or technical advantage mentioned in one embodiment is applicative to the other embodiments.

Figure 1:
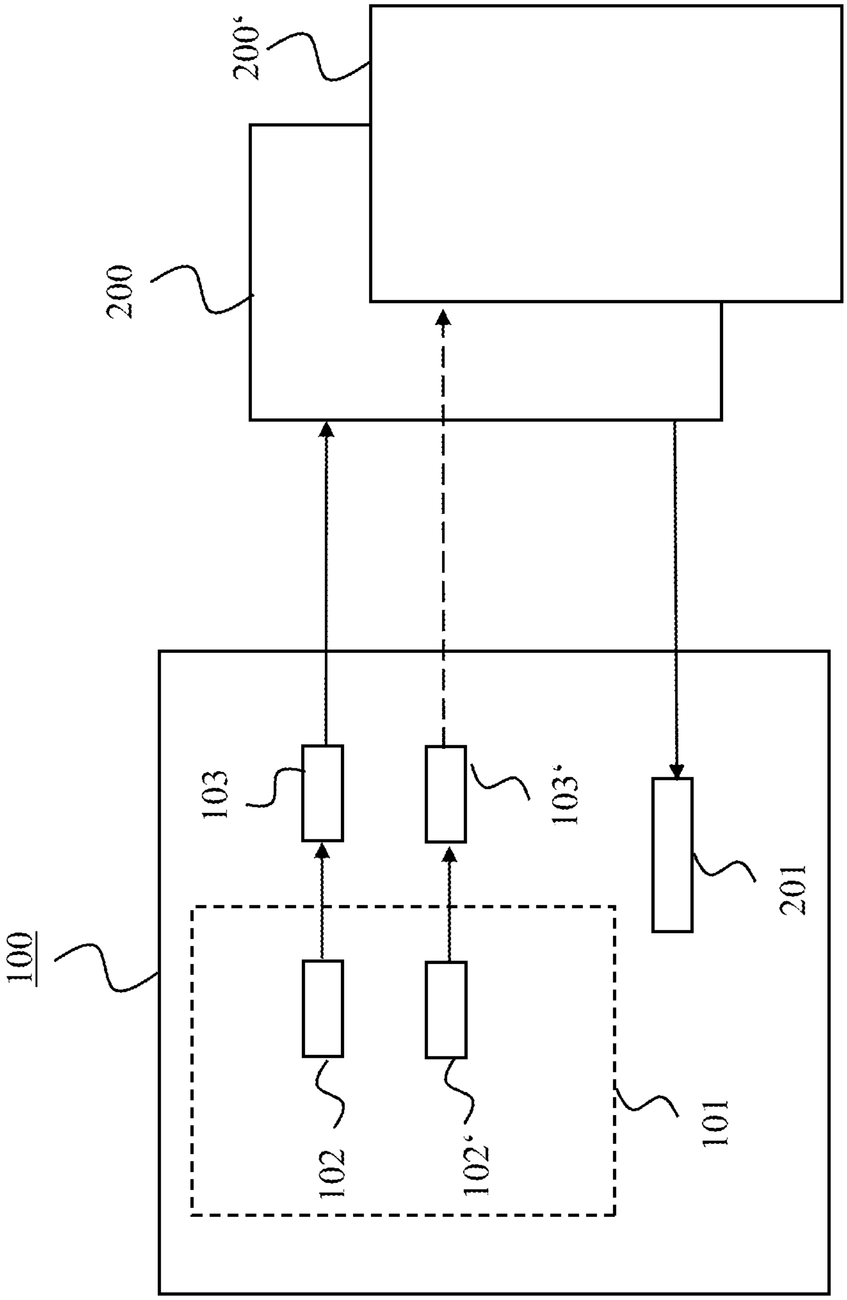
FIG. 1 shows a transmitting device according to an embodiment of the present disclosure.

FIG. 1 shows a transmitting device 100 adapted for RDMA according to an embodiment of the disclosure. The transmitting device 100 may comprise processing circuitry (not shown) configured to perform, conduct or initiate the various operations of the transmitting device 100 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. The transmitting device 100 may further comprise memory circuitry, which stores one or more instruction(s) that can be executed by the processor or by the processing circuitry, in particular under control of the software. For instance, the memory circuitry may comprise a non-transitory storage medium storing executable software code which, when executed by the processor or the processing circuitry, causes the various operations of the transmitting device 100 to be performed. In one embodiment, the processing circuitry comprises one or more processors and a non-transitory memory connected to the one or more processors. The non-transitory memory may carry executable program code which, when executed by the one or more processors, causes the transmitting device 100 to perform, conduct or initiate the operations or methods described herein.

In particular, the transmitting device 100 is configured to maintain a send queue 101, wherein the send queue 101 comprises one or more WQEs 102, 102". In particular, each WQE 102, 102' comprises destination information of the WQE 102, 102'. The destination information comprises at least one of: an address of a receiving device 200, an identifier of a receiving device (200, 200"), and an identifier of a target application of a receiving device 200, 200'. The transmitting device 100 is further configured to assign each of the one or more WQEs 102, 102' with an XID, and translate each WQE 102, 102' into a respective packet 103, 103". Each respective packet 103, 103' comprises the XID of the corresponding WQE 102, 102' and is associated with a PSN. Then, the transmitting device 100 is configured to transmit each packet 103, 103' to the receiving device (200, 200') of the destination information of the WQE 102, 102'. The transmitting device 100 is further configured to receive a notification message 201 for each transmitted packet 103 from the receiving device 200, wherein the notification message 201 indicates whether the transmitted packet 103 is received at the receiving device 200. Further, the transmitting device 100 is configured to determine whether or not to generate a completion for each WQE 102, based on the notification message 201, on information carried in the WQE 102 and information held by the transmitting device 100.

Embodiments of this disclosure introduce a new approach where each WQE (each RDMA operation) or each message can be processed independently. e.g., to be executed without dependence on previous or later operations. Each WQE includes all the required information to enable the execution of the operation, such as an indication (ID, address, etc.) of the destination node (e.g., the receiving device 200) and process.

For example, an RDMA transaction involves an initiator node and a destination target node (or a target node). The initiator node initiates or sends an RDMA operation request, and the target node receives the RDMA operation request and responds accordingly. The transmitting device 100 shown in FIG. 1 may be considered as the initiator node, and the receiving device 200 shown in FIG. 1 may be considered as the target node.

According to embodiments of this disclosure, each WQE is associated with a unique XID, this can be used at the receiving side to detect duplicate operations. Each transmitted packet is associated with a unique PSN. Notably, each packet is required to be acknowledged as received. The initiator node uses these ACK signals to detected lost packets and applies, for example, selective-repeat retransmission schemes to do retransmissions.

Conventionally. RDMA QPs are always generating a completion on some opcodes (RQ processing, etc.). There is no control to manipulate a conditional completion. According to embodiments of this disclosure, completions may be configurable. That is, the transmitting device 100 may decide whether to signal a WQE as completed, based on certain circumstances. e.g., the information held by the transmitting device 100.

For instance, the transmitting device 100 may obtain information from an ULP, which set the transmitting device 100 to get a completion signal after every X numbers of completed WQEs, so that the ULP checks the completion queue (CQ) for completion queue events (CQEs) in a lower frequency instead of for each independent WQE. In another example, the transmitting device 100 may be instructed to generate completion when there are no more WQEs to be processed by a certain Node-to-Node context (NNC). Optionally, the transmitting device 100 may also signal a completion for every high priority WQE, and signal a completion only for a group of lower priority WQEs. There are a number of implementations forms in this matter. These examples are not used to limit the present disclosure.

Figure 2:
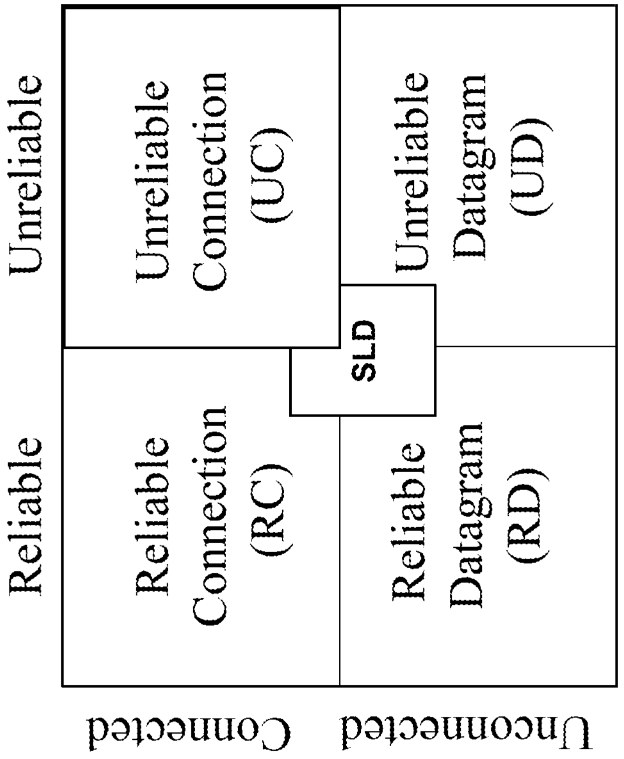
FIG. 2 shows a schematic diagram according to an embodiment of the present disclosure.

The new service approach as described in this disclosure may be referred to as Short-Lived Datagram (SLD). As previously described, the type of transports may be either reliable or unreliable, and connection-oriented or datagram-oriented. The SLD as described in this disclosure applies to most of the transports, such as Reliable Connection (RC), Reliable Datagram (RD), and Unreliable Datagram (UD), as shown in FIG. 2. That is, the present disclosure is exposing a new service that is between legacies RD, RC and UD transports.

It should be noted that the new RDMA transport solution proposed by embodiments of the disclosure is for processing short messages, e.g., messages up to the length of a single packet. According to an embodiment of this disclosure, each WQE 102, 102' carries a message that is limited to fit in a single network maximum transmission unit.

Typically, RDMA operations comprise Read, Write, Send, Receive, Atomic, etc.

Figure 3:
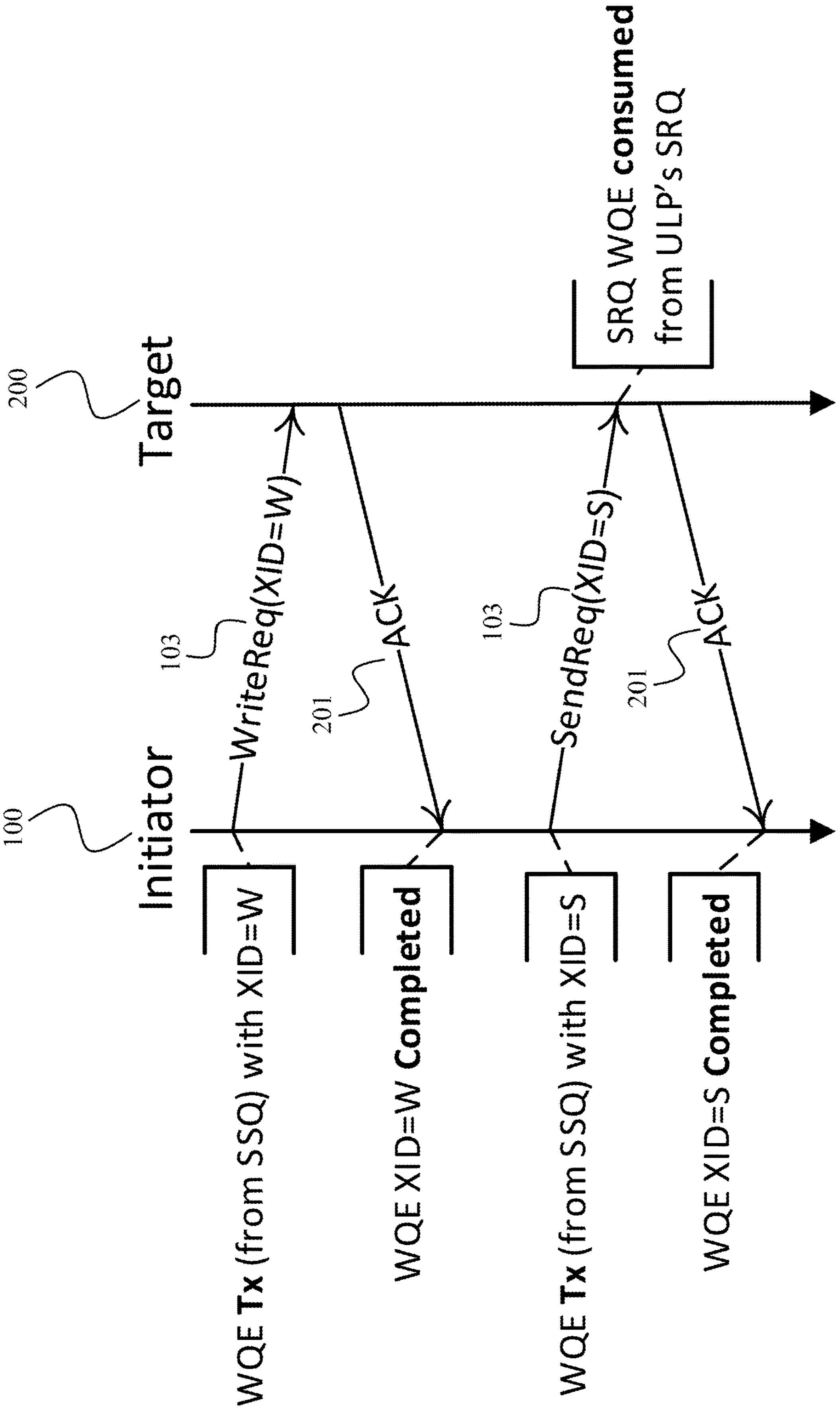
FIG. 3 shows a signaling flowchart between an initiator node and a target node according to an embodiment of the present disclosure.

FIG. 3 shows a signaling flowchart between an initiator node, e.g., the transmitting device 100, and a target node, e.g., the receiving device 200, according to an embodiment of the disclosure. The transmitting device 100 may be the transmitting device as shown in FIG. 1, and the receiving device 200 may be the receiving device as shown in FIG. 1. In particular, FIG. 3 illustrates packets exchanges for a Write operation and a Send operation.

In this embodiment, a transmit (Tx) WQE from a source send queue (SSQ), e.g., the send queue 102, is assigned with an XID W. The WQE, e.g., the WQE 102 as shown in FIG. 1, is translated into a Write request carrying the XID W. e.g., the packet 103 as shown in FIG. 1. After the transmitting device 100 transmits the packet 103, an ACK is received at the transmitting device 100. Accordingly, the transmitting device 100 may determine that the WQE with the XID W is successfully completed. After receiving the Write request, the receiving device 200 may place data, which is carried on the Write request, into a destination memory location in the receiving device 200.

In the following, another WQE with an XID S is translated into a Send request carrying the XID S. The receiving device 200 may accordingly place data, which is carried on the Send request, into a buffer from an RQ of the receiving device 200. After receiving an ACK for the Send request from the receiving device 100, the transmitting device 100 may determine that the WQE with the XID S is successfully completed. It should be noted that a WQE may be signaled as completed as soon as an ACK is received for it, without waiting for previous WQEs to complete.

According to an embodiment of this disclosure, when the WQE 102 corresponding to a respective packet 103 comprises a Write operation request or a Send operation request, and the notification message 201 indicates that the respective packet 103 is received at the receiving device 200, the transmitting device 100 is further configured to determine that the WQE 102 is completed successfully.

Figure 4:
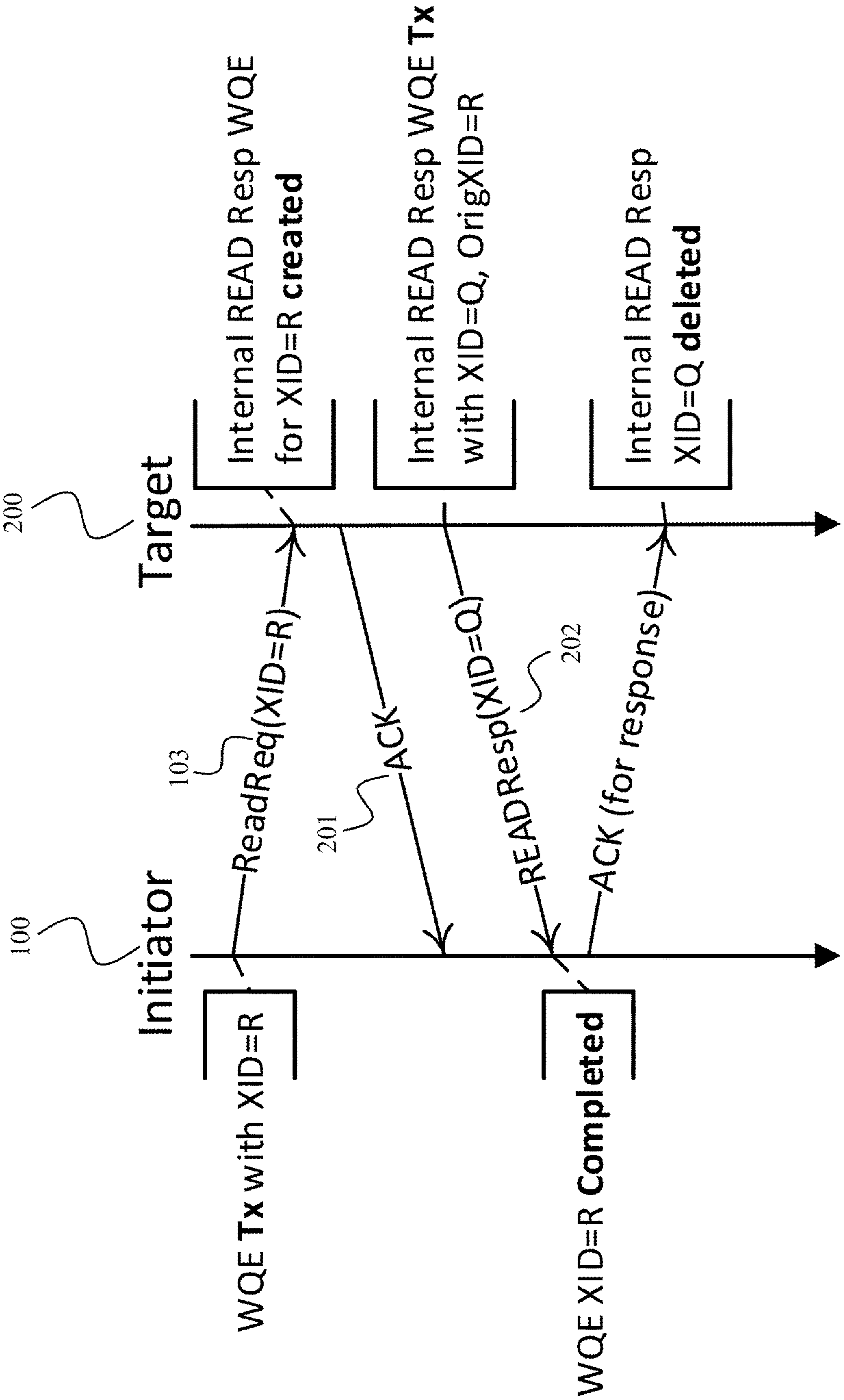
FIG. 4 shows a signaling flowchart between an initiator node and a target node according to another embodiment of the present disclosure.

FIG. 4 shows another signaling flowchart between an initiator node, e.g., the transmitting device 100, and a target node, e.g., the receiving device 200, according to an embodiment of the disclosure. The transmitting device 100 may be the transmitting device as shown in FIG. 1, and the receiving device 200 may be the receiving device as shown in FIG. 1. In particular, FIG. 4 illustrates packets exchanges for a Read operation or an ATOMIC operation.

In this embodiment, a Tx WQE is assigned with an XID R. The WQE, e.g., the WQE 102 as shown in FIG. 1, is translated into for example a Read request carrying the XID R. e.g., the packet 103 as shown in FIG. 1. After the transmitting device 100 transmits the packet 103, an ACK is received at the transmitting device 100.

For a Read operation, for example, the transmitting device 100 further expects a Read operation response from the receiving device 200. That is, a Read WQE will not be completed when the receiving device 200 acknowledges the receiving of the corresponding packet, but only when an appropriate response packet is received by the transmitting device 100. In this case, the receiving device 200 internally creates a response WQE for the WQE 102.

For example, the receiving device 200 intends to send the response WQE back to the transmitting device. In such a case, it may be understood that the roles of the "transmitting device" and the "receiving device" are switched. That is, the receiving device 200 here may also be considered as a "transmitting device" that sends a packet carrying a WQE, which is a response WQE. According to the embodiment of this disclosure, the receiving device 200 generates the response WQE for the Read operation request, assigns the response WQE with another XID, e.g., XID Q as shown in FIG. 4. The receiving device 200 further translates the response WQE into a response packet 202 and sends the response packet 202 to the transmitting device 100.

It may be worth mentioning that a difference of the response packet 202 from a "normal" transmitted packet 103 from the transmitting device 100, is that the response packet 202 further carries the original XID (e.g., XID R) of the WQE corresponding to the operation request, e.g., the transmitted packet 103. That is, two XIDs (e.g., XID R and XID Q) are carried in the response packet 202.

In response to the reception of the response packet 202, the transmitting device 100 shall send an ACK to notify the receiving device 200 that the response packet 202 has been received. For example, in such a case, the transmitting device 100 here behaves similarly as a "receiving device".

According to embodiments of this disclosure, when the Tx WQE carries an ATOMIC operation request, packets exchange between the transmitting device 100 and the receiving device 200 is similar to the case of the Read operation. Details are not described here.

According to an embodiment of this disclosure, when the WQE 102 corresponding to a respective packet 103 comprises a Read operation request or an ATOMIC operation request, the transmitting device 100 is further configured to receive, as an Atomic operation response or a Read operation response to the Atomic operation request or the Read operation request, respectively, a response packet 202 indicating that the respective packet 103 has been processed by the receiving device 200. In particular, the response packet 202 comprises an XID of a response WQE 102 and the XID of the WQE 102 that comprises the Read operation request or the ATOMIC operation request. Further, the transmitting device 100 is configured to determine that the WQE 102 is completed successfully.

Figure 5:
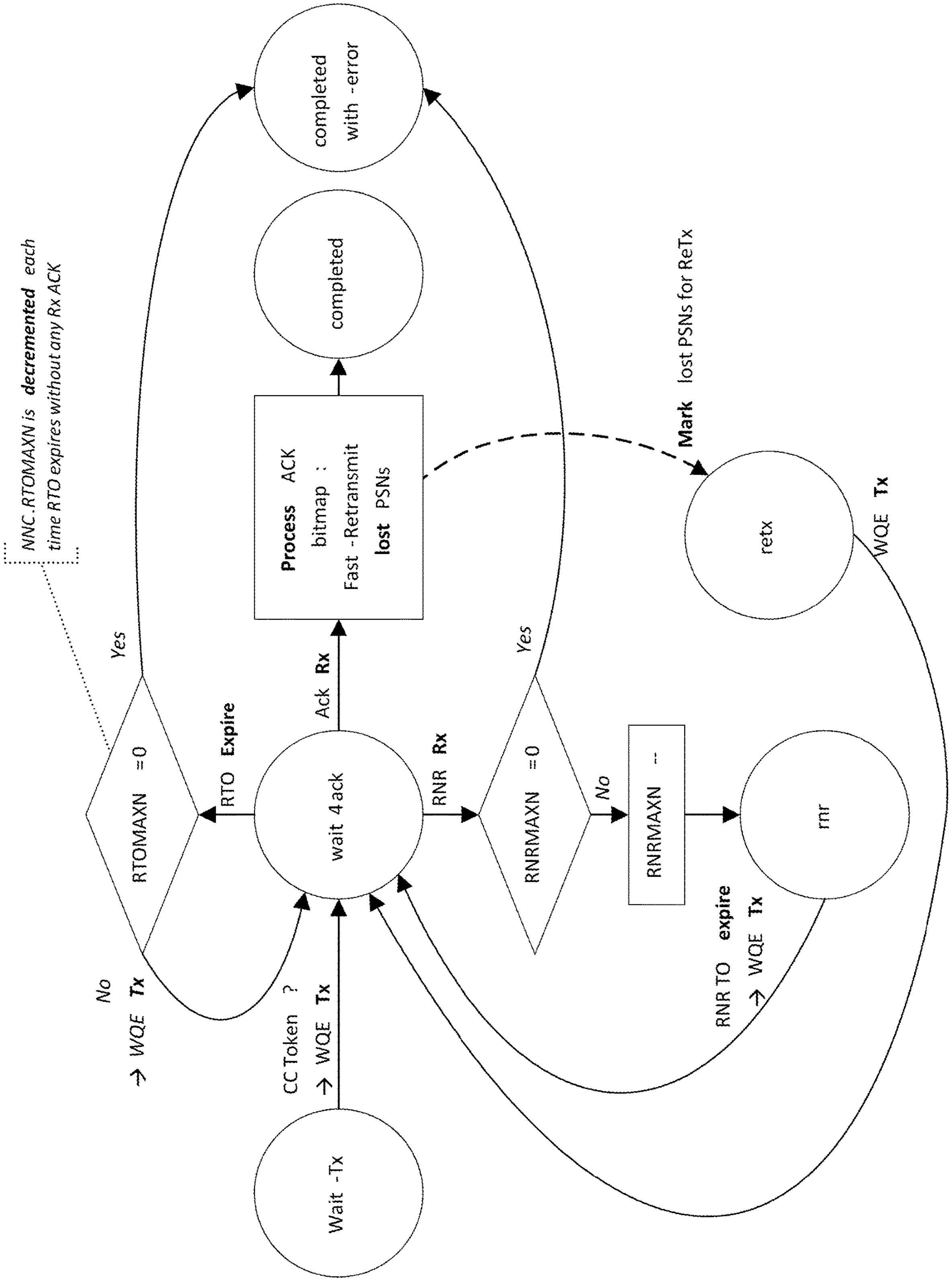
FIG. 5 shows a flowchart of WQE's State Machine according to an embodiment of the present disclosure.

FIG. 5 shows illustrations of the state machines that govern each WQE's processing, at the initiator node, e.g., the transmitting device 100. Each WQE is processed independently of all other WQEs. In particular, even for WQEs that are issued by the same source ULP, they are still processed independently.

It can be seen from this figure that once a WQE (e.g., WQE Tx) is transmitted, an ACK is expected.

For the case that the ACK is received, a database (e.g., a bitmap) storing the status of the transmitted packets may be updated accordingly. If a packet is detected as missing, a Fast-retransmission mechanism may be applied to retransmit the missing packet. For a retransmitted packet, again an ACK is expected.

In the case that no ACK is received, the transmitting device may wait for a retransmit timeout to expire, before retransmitting the packet. For example, there may be a maximum number of acceptable receive timeout "RTOMAXN" configured for the transmitting device. If the value of RTOMAXN" is greater than 0, for each time the retransmit timeout expires without receiving an ACK, the value of "RTOMAXN" decremented (e.g., by 1). Once it reaches 0), the transmitting device 100 determines that the WQE is completed with error.

According to an embodiment of this disclosure, the transmitting device 100 may be configured to obtain a maximum number of acceptable receive timeout that is associated with the receiving device 200. When a number of receive timeouts exceed the maximum number of acceptable receive timeouts, the transmitting device 100 may be configured to determine that the WQE 102 corresponding to the respective packet 103 is completed with error.

This disclosure further proposes an RNR signal for delaying the transmission of further messages. In particular, when a received packet carrying a message that temporarily cannot be processed by the receiving device (for instance, if the receiving device does not have available resources), the transmitting device receives the RNR indication. For example, a performance-limiting phenomenon that occurs when a line of packets is held up by the first packet, is named HoL blocking. RNR signal affects only the specific message, at the transmitting device, avoiding any HoL blocking.

Possibly, instead of the ACK, an RNR indication (or a notification message comprising an RNR indication) indicating that the receiving device 200 temporarily cannot process the transmitted packet may be received. Then a counter of the maximum number of acceptable RNR indications "RNRMAXN" will be checked. If the counter reaches 0), the transmitting device 100 determines that the WQE is completed with error. If the counter has not reached 0, for each received RNR indication, the counter decremented (e.g., by 1), once the counter reaches 0), the transmitting device 100 determines that the WQE is completed with error.

According to an embodiment of this disclosure, the notification message 201 shown in FIG. 1 may comprise an RNR indication, wherein the RNR indication indicates that the receiving device 200 cannot process the transmitted packet. The transmitting device 100 is configured to determine an XID comprised in the transmitted packet 103. The transmitting device 100 is further configured to postpone transmitting another packet comprising the same XID before a timeout value expires.

After the timeout expires, the transmitting device 100 retransmits the packet comprising the same XID. It is possible that the receiving device 200 still cannot process the transmitted packet. In such a case, another RNR indication for the retransmitted packet may be sent from the receiving device 200. According to an embodiment of this disclosure, the WQE 102 may further include a parameter indicating a maximum number of acceptable RNR indications. i.e., "RNRMAXN" as shown in FIG. 5. Possibly, the transmitting device 100 may receive a further notification message that comprises an RNR indication for the retransmitted packet. The transmitting device 100 may be further configured to determine that the WQE 102 corresponding to the retransmitted packet is completed with error, when a number of received RNR indications exceed the "RNRMAXN".

According to an embodiment of this disclosure, the notification message 201 may comprise a plurality of RNR indications, each RNR indication indicating that the receiving device 200 cannot process a particular transmitted packet. For example, the timeout value may be indicated by the RNR indication.

Optionally, each RNR indication further indicates that the receiving device 200 cannot process a particular transmitted packet within a particular timeout value.

According to an embodiment of this disclosure, the transmitting device 100 may be further configured to manage WQEs 102, 102' corresponding to transmitted packets 103, 103' for which an RNR indication is received, based on the timeout values indicated by the RNR indications.

Optionally, the transmitting device 100 may group the delayed WQEs in RNR "state" according to the received RNR timeout value. According to this disclosure, when a WQE is in RNR state, it means that an RNR indication is received for that WQE. WQEs in RNR "state" may be managed together by the transmitting device 100, e.g., the initiator node, not per NNC. Typically, only a small limited number of RNR timeout values are defined, to maintain overall low completion latency and to reduce the number of required timers. The initiator node groups delayed WQEs in RNR "state" according to the received RNR timeout value, which may be set by the target node, e.g., the receiving device 200.

According to an embodiment of this disclosure, a number of supported timeout values are configurable and agreed upon on all communication devices.

Optionally, the receiving device 200 may be configured to set the timeout value based on the current condition of the receiving device 200. For instance, the receiving device 200 may adjust the timeout value based on its current load, the number of connected NNCs, the number of remaining RQ elements (inside the RQ).

Figure 6:
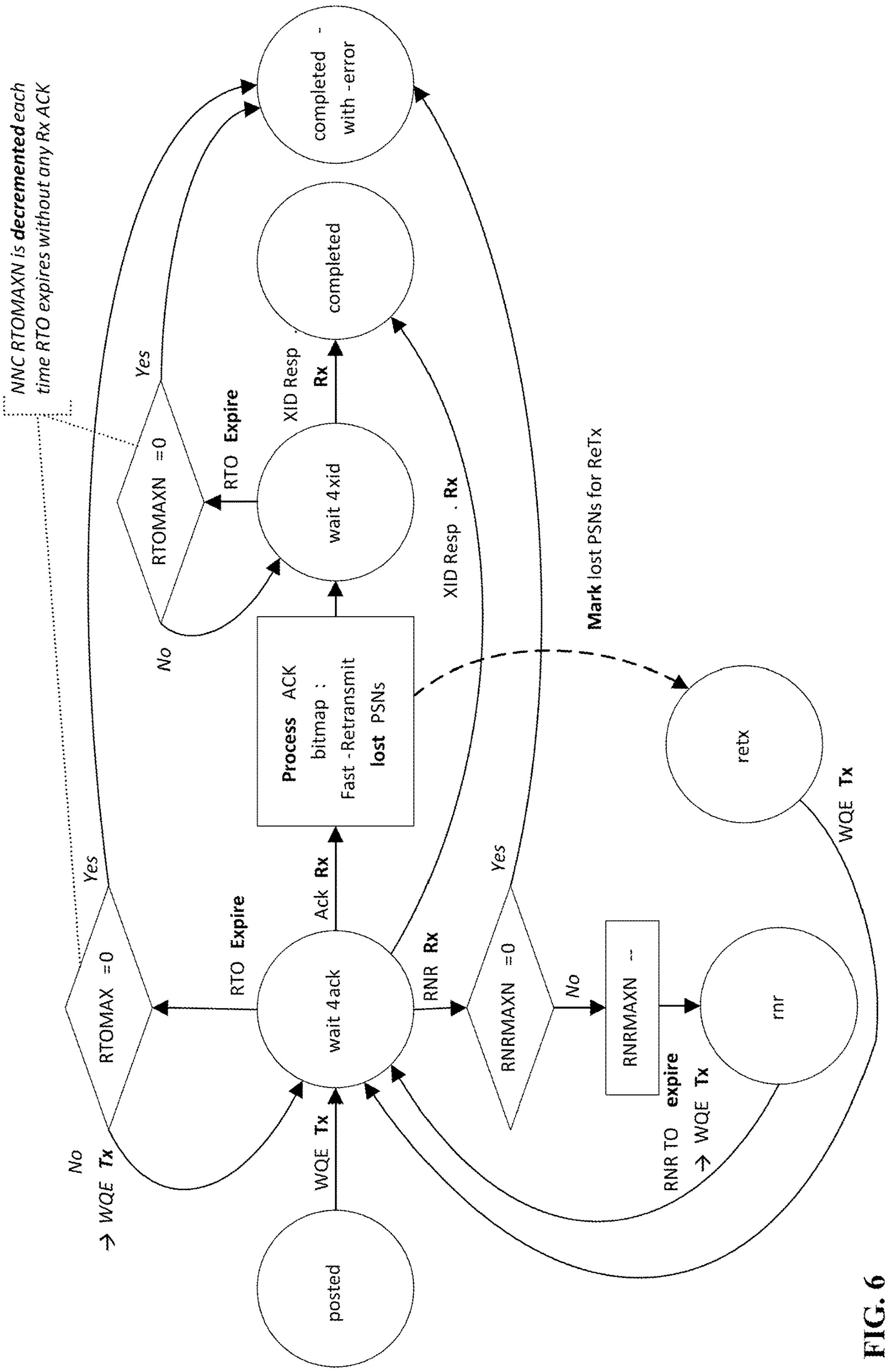
FIG. 6 shows a detailed flowchart of WQE's State Machine according to an embodiment of the present disclosure.

FIG. 6 shows illustrations of Read/ATOMIC WQE's state machines according to an embodiment of the disclosure. FIG. 6 is based on FIG. 5, while FIG. 5 shows a more general case for all RDMA operations.

Similarly, like FIG. 5, once a WQE (e.g., WQE Tx) is transmitted, an ACK is expected. In the case that no ACK is received, or instead of the ACK, an RNR indication indicating that the receiving device 200 temporarily cannot process the transmitted packet is received at the transmitting device 100, the transmitting device 100 operates similarly as described in FIG. 5. Details are not repeated here.

For the case that the ACK is received, a database (e.g., a bitmap) storing the status of the transmitted packets may be updated accordingly. If a packet is detected as missing, a Fast-retransmission mechanism may be applied to retransmit the missing packet. For a retransmitted packet, again an ACK is expected. This part is also similar as described in FIG. 5.

As previously mentioned, READ and/or ATOMIC "verb" operations require that the target node transmits back the data to the initiator node. That is, a READ/ATOMIC WQE is not completed when an ACK is received for its request packet, but only when the appropriate response packet is received by the initiator node.

That is, upon receiving a READ and/or ATOMIC request packet, a target node, the receiving device 200, stores an internal response WQE, for managing the transmission, and possibly retransmission, of the response packet. This internal property of this WQE means it is "hidden" from upper-layers software, that it is not posted by a ULP and that a completion event/signal is not reported to any upper-layers software, at the target node.

In case that the receiving device 200 does not have available resources to store this internal response WQE, an RNR signal packet is generated and transmitted back to the transmitting device 100.

According to an embodiment of the disclosure, a target node, e.g., the receiving device 200, processes an internal response WQE as if it was posted by a ULP. The same state-machine rules and conditions apply to such a situation, e.g., retransmit the response packet until an ACK is received or until an error condition is identified (but this error is not reported to any ULP).

According to an embodiment of this disclosure, the one or more WQEs 102, 102' of the send queue 101 comprises a first WQE and a second WQE, wherein the first WQE and the second WQE comprise different destination information.

As previously described, each WQE includes its own destination information (e.g. target ID, destination IP address, etc.), to enable a source ULP to post multiple consecutive WQEs, each may be destined to a different target ULP and network node, using the same QP-like data-structure.

According to an embodiment of this disclosure, the one or more WQEs 102, 102' of the send queue 101 comprises a set of WQEs comprising the same destination information, and wherein the transmitting device 100 is further configured to group the packets corresponding to the set of WQEs into a stream of packets: and transmit the stream of packets to the receiving device 200 of the set of WQEs.

The various WQEs may be grouped by their destination into a stream of packets to their destination target node. The management of this stream of packets is done by using an NNC data structure. A single NNC manages WQEs between an initiator-target pair of nodes.

According to an embodiment of this disclosure, each WQE 102, 102' is further associated with a priority for being transmitted from the transmitting device 100. Optionally, the priority of each WQE 102, 102' may be determined based on the ULP from which that WQE (102, 102) is obtained. For example, if a SLD QP created by a ULP is associated with a higher priority. WQEs that are pulled from the SQ will be associated with a higher priority. Accordingly, such WQEs will be processed before processing WQEs from other ULP's SQs, which is possibly created with a lower priority.

According to an embodiment of this disclosure, the transmitting device 100 may be further configured to obtain the one or more WQEs 102, 102" from at least one ULP.

According to an embodiment of this disclosure, the set of WQEs comprising the same destination information is obtained from different ULPs. That is, the various WQEs from different source ULPs may be grouped by their destination into a stream of packets.

According to an embodiment of this disclosure. XIDs for WQEs obtained from different ULPs are assigned from the same XID pool, and PSNs for packets associated with the WQEs obtained from different ULPs are assigned from the same PSN pool.

Each WQE is assigned a unique XID from a continuous number space that is used for all WQEs, which share the same destination target node. Each Tx packet is assigned a unique PSN from a continuous number space that is used for all packets, which are Tx to the same destination target node.

According to embodiments of this disclosure, a Node-to-Node context (NNC) can be divided into two operational parts: NNC-Tx used by an initiator function, and NNC-Rx by a target function. NNC-Tx maintains the different continuous number spaces for XIDs and PSNs. NNC-Rx processes received ACKs and RNR indications to detect lost packets and to trigger NNC-Tx to perform retransmissions of those packets. It should also be noted that timer expirations also cause detection of lost packets, which will trigger the retransmission.

Figure 7:
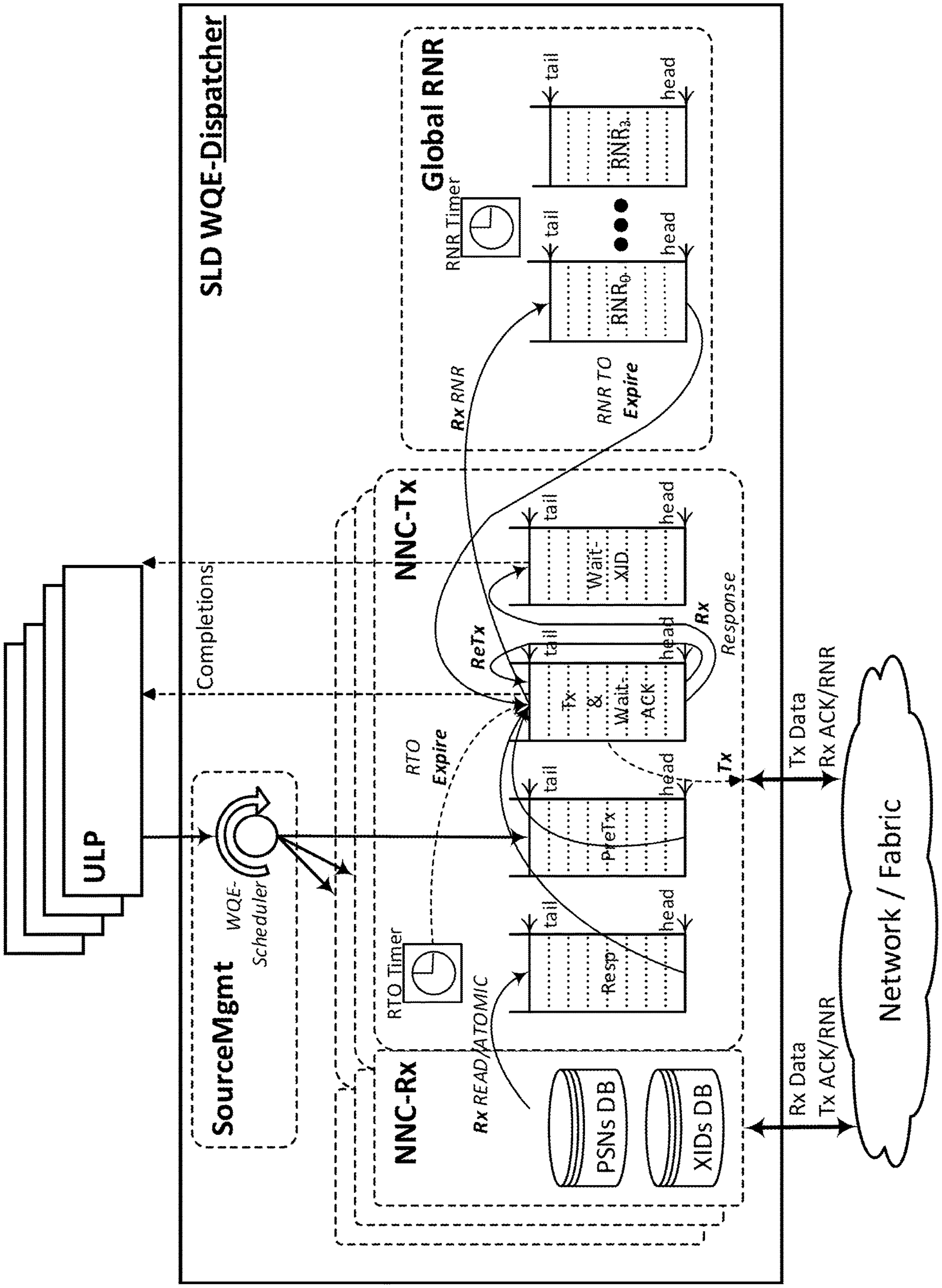
FIG. 7 shows a schematic diagram of a Short-Lived Datagram (SLD) WQE dispatcher according to an embodiment of the present disclosure.

FIG. 7 shows an example schematic diagram of the SLD WQE dispatcher according to an embodiment of the disclosure. NNC-Rx may store the "received XIDs" state and identify duplicate WQEs, for instance, using PSNs database and XIDs database. These duplicates are only acknowledged but not executed again. This is to guarantee that a WQE is executed exactly once. NNC-Rx constructs ACKs to indicate both received and lost packets, based on PSNs. NNC-Rx constructs RNR indications to indicate multiple RNR signals for multiple packets.

Further, an NNC may include a threshold for signaling network-related error conditions, e.g. the receive/retransmission timer's period, the maximum number of timer expirations (without receiving any ACK/RNR packets).

An NNC includes congestion control (CC) related information and parameters, that govern the transmission of packets managed by this NNC.

It may be worth mentioning that NNC-Rx's "Rx XIDs" state database could be a shared resources pool, from which any NNC-Rx can allocate required resources, upon demand. Optionally, a single RTO timer could be used for all NNC-Tx instances. Possibly, memory for storing WQEs could be a part of the host machine's memory, a dedicated memory attached to the RNIC, internal memory, or any combination of. To avoid a single ULP consuming too many RNIC resources (for WQEs), thus "starving" other ULPs and deny them effective SLD service, a fairness mechanism could be added to enforce a maximum number of outstanding WQEs per ULP.

According to an embodiment of this disclosure, each packet 103, 103' may be further associated with a flowlet ID identifying a flowlet. In particular, the flowlet comprises a plurality of packets, and the packet 103, 103' corresponding to the WQE 102, 102' further comprises the flowlet ID.

According to an embodiment of this disclosure, the transmitting device 100 may be further configured to transmit each packet 103 to the receiving device 200 via the flowlet, wherein the flowlet is associated with the receiving device 200.

It may be worth mentioning that ECMP flowlets are supported by the new approach prosed in this disclosure and the transport is designed for flowlets. ECMP flowlets are (relatively easily) supported by dividing the stream of packets between an initiator node and a target node into sub-streams. Packets of different sub-streams are assumed to traverse the network using a different route. To support ECMP flowlets, the NNC-Tx maintains a separate (continuous) PSN space for each sub-stream, e.g. flowlet. Each WQE is assigned a flowlet ID and this flowlet ID is also included in the Tx packet. Each ACK report also includes this flowlet ID and upon receiving an ACK, the initiator node triggers retransmission of packets only of this flowlet. Decision flexibility exists that allows the initiator node to dynamically choose a different flowlet to use for retransmission. This decision could be based on any combination of criteria, e.g. a "better" flowlet that is less loaded, faster, less congested, etc. Embodiments of this disclosure also allow a different number of flowlets per NNC, allowing more efficient use of resources at the initiator node, e.g., the transmitting device 100.

Figure 8:
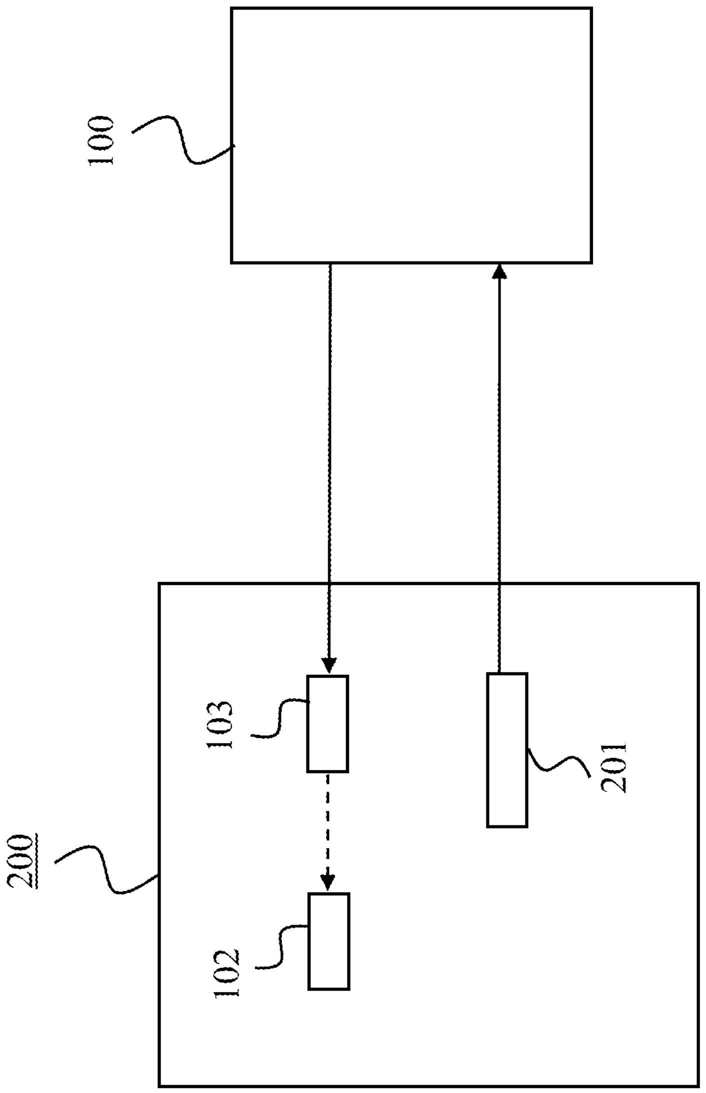
FIG. 8 shows a receiving device according to an embodiment of the present disclosure.

FIG. 8 shows a receiving device 200 adapted for RDMA according to an embodiment of the disclosure. The receiving device 200 may comprise processing circuitry (not shown) configured to perform, conduct or initiate the various operations of the receiving device 200 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. The receiving device 200 may further comprise memory circuitry, which stores one or more instruction(s) that can be executed by the processor or by the processing circuitry, in particular under control of the software. For instance, the memory circuitry may comprise a non-transitory storage medium storing executable software code which, when executed by the processor or the processing circuitry, causes the various operations of the receiving device 200 to be performed. In one embodiment, the processing circuitry comprises one or more processors and a non-transitory memory connected to the one or more processors. The non-transitory memory may carry executable program code which, when executed by the one or more processors, causes the receiving device 200 to perform, conduct or initiate the operations or methods described herein.

In particular, the receiving device 200 is configured to receive one or more packets 103 from a transmitting device 100 for RDMA. Possibly, the transmitting device 100 here may be the transmitting device 100 shown in FIG. 1. In particular, each packet 103 of the one or more packets 103 is associated with a PSN, and comprises an XID of a corresponding WQE 102. Each WQE 102 comprises destination information of the WQE 102, wherein the destination information comprises at least one of: an address of the receiving device 200, an identifier of the receiving device 200, and an identifier of a target application of a receiving device 200. Further, the receiving device 200 is configured to transmit a notification message 201 to the transmitting device 100, wherein the notification message 201 indicates that the one or more packets are received at the receiving device 200.

Embodiments of the present disclosure further provide a receiving device 200 that operates accordingly to the transmitting device 100 as previously described in this disclosure. The receiving device 200 proposed in this disclosure treats each received packet 103 independently. That is, each received packet can be safely executed when it is received, regardless of the state of any previous packet. Following this disclosure, WQEs may be executed out-of-order and are signaled as completed out-of-order, as soon as their ACK is received. Order refers to the order in time in which the WQEs are posted to the RNIC, for instance by a ULP.

It may be worth mentioning that an ACK supports aggregating notifications for multiple packets and supports "selective ACK" (SACK) to report both received and lost packets. The number of such reported packets, e.g. the size of the ACK data structure, is an implementation parameter.

According to an embodiment of this disclosure, when the WQE 102 corresponding to a respective packet 103 comprises a Write operation request, the receiving device 200 is further configured to place data, which is carried on the Write operation request, into a destination memory location in the receiving device 200. Similarly, when the WQE 102 corresponding to a respective packet 103 comprises a Send operation request, the receiving device 200 may be further configured to place data, which is carried on the Send operation request, into a buffer from a receive queue of the receiving device 200.

According to an embodiment of this disclosure, when the WQE 102 corresponding to a respective packet 103 comprises a Read operation request or an ATOMIC operation request, the receiving device 200 is further configured to transmit a response packet 202 indicating that the respective packet 103 has been processed by the receiving device 200, to the transmitting device 100.

For example, for a Read operation or ATOMIC operation, the receiving device 200 operates accordingly to provide a response packet carrying the required data. For instance, the Read operation response contains data that the transmitting device 100 intended to fetch from the receiving device 200.

According to an embodiment of this disclosure, the receiving device 200 may be further configured to create a response WQE according to the Read operation request or the ATOMIC operation request. The receiving device 200 is further configured to assign the response WQE with an XID and translate the response WQE into the response packet 202. In particular, the response packet 202 comprises the XID of the response WQE and the XID of the WQE 102 that comprises the Read operation request or the ATOMIC operation request.

It should be understood that in such a case, the receiving device 200 may be considered as a "transmitting device", which assigns a (response) WQE with an XID, translates the WQE into a (response) packet and further sends the packet. A difference of the response packet from a "normal" transmitted packet is that the response packet further carries the XID of the WQE corresponding to the operation request, e.g., the transmitted packet. That is, two XIDs are carried in the response packet.

According to an embodiment of this disclosure, the receiving device 200 may be further configured to generate an RNR indication for a received packet 103, when the receiving device 200 cannot process the respective packet 103. In particular, the notification message 201 for the respective packet 103 further comprises the RNR indication indicating the transmitting device 100 that the receiving device 200 cannot process the respective packet 103.

A received message that temporarily cannot be processed by the receiving device 200 as the target node, is delayed by an RNR signal. For example, the RNR signal affects only the specific message, at the initiator, avoiding any HoL blocking. WQEs in RNR "state" are managed together by the initiator node, not per NNC. Only a small limited number of RNR TO values are defined, to maintain overall low completion latency and to reduce the number of required timers. The initiator node groups delayed WQEs in RNR "state" according to the received RNR TO value, set by the target node.

According to an embodiment of this disclosure, the RNR indication further indicates a preset timeout value, wherein the RNR indication indicates that the receiving device 200 cannot process the respective packet 103 within the preset timeout value.

According to an embodiment of this disclosure, the notification message 201 comprises a plurality of RNR indications, each RNR indication indicating that the receiving device 200 cannot process a particular transmitted packet.

Possibly, the one or more packets 103 comprise a first packet and a second packet, wherein a PSN of the first packet is smaller than a PSN of the second packet. According to an embodiment of this disclosure, the receiving device 200 may be further configured to transmit the notification message for the first packet and the notification message for the second packet out-of-order. The receiving device 200 is further configured to process the first packet and the second packet out-of-order: and transmit the response message for the first packet and the response message for the second packet to the transmitting device 100 out-of-order.

According to an embodiment of this disclosure, the receiving device 200 may be further configured to maintain a database storing XIDs of WQEs 102 that are received at the receiving device 200.

According to an embodiment of this disclosure, the receiving device 200 may be further configured to determine for each received packet 103 whether it is a duplicated packet, by checking whether an XID of WQE 102 comprised in the received packet 103 has been stored in the database: and ignore any duplicated packet. These duplicates are only acknowledged but not executed again. This is to guarantee that a WQE is executed exactly once.

According to an embodiment of this disclosure, the database further comprises a state of each WQE 102 that indicates whether the WQE 102 has been processed.

In this disclosure, SLD is designed for lossy networks, as opposed to traditional IB's RDMA. This network property means that an event of a packet loss is more probable. SLD employs a retransmission scheme, which may have two complementary mechanisms: PSN-based and timer-based. PSN-based retransmission may be based on a unique strictly monotonically increasing PSN assigned to every transmitted packet and to quickly identify lost packets when a "gap" is detected in the PSNs reported back by an ACK. Timer-based retransmission is similar to the traditional way of triggering an event of retransmission: if no ACKs are received during a configurable period of time, all outstanding packets are retransmitted. Outstanding packets are defined as the packets that were transmitted but an ACK is not received yet.

To summarize, embodiments of this disclosure propose a new RDMA service and transport (SLD) that is between RC, RD, and UC services. SLD provides coverage of all RDMA operations and has a more efficient retransmission scheme. Embodiments of this disclosure enable multiplexing operations/WQEs from different ULPs, and also towards different targets. ECMP-flowlets are also supported.

Figure 9:
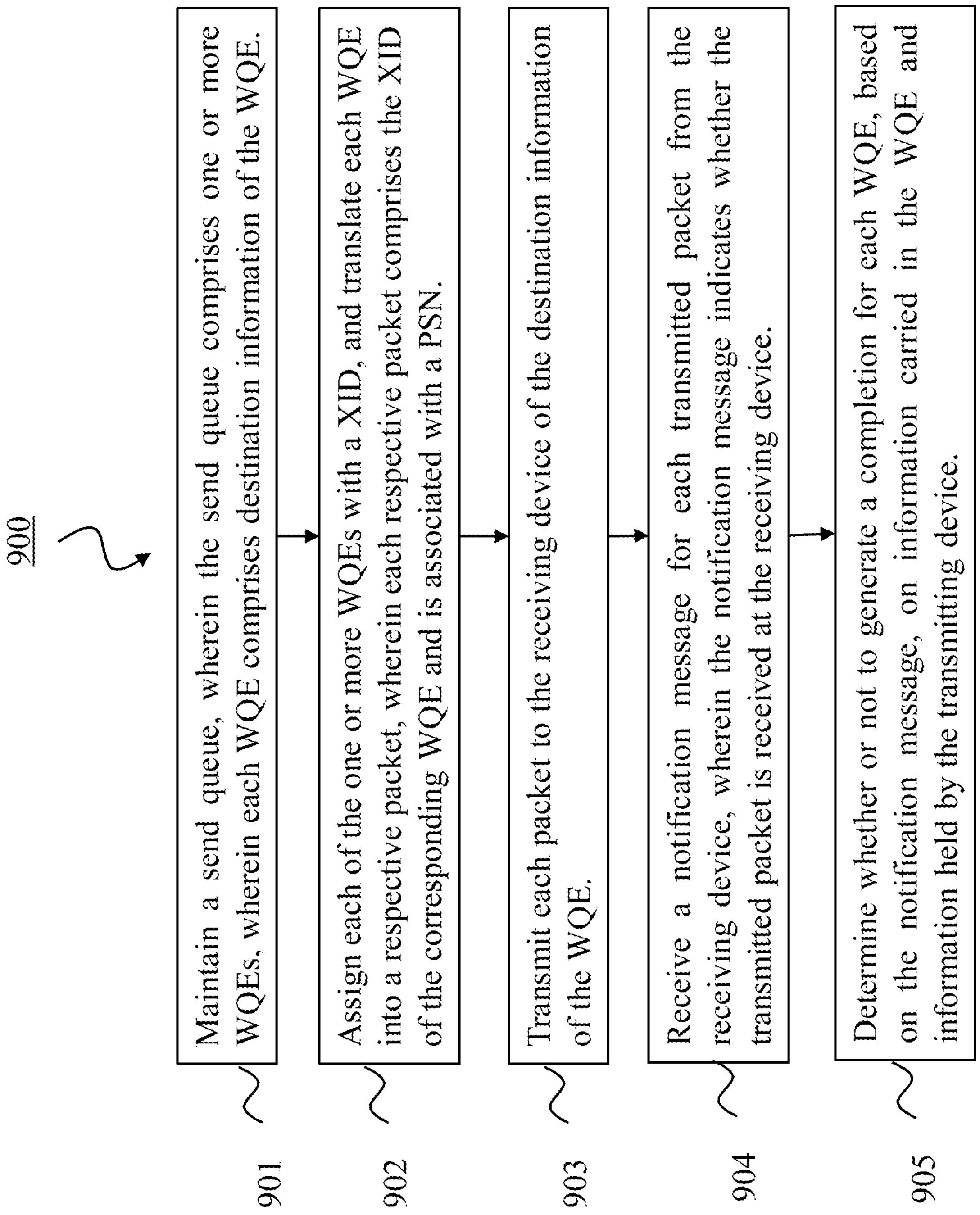
FIG. 9 shows a method for RDMA according to an embodiment of the present disclosure.

FIG. 9) shows a method 900 for RDMA according to an embodiment of the disclosure. In a particular embodiment of the disclosure, the method 900 is performed by a transmitting device 100 shown in FIG. 1 or FIG. 8. The method 900 comprises a step 901 of maintaining a send queue 101, wherein the send queue 101 comprises one or more WQEs 102, 102'. Each WQE 102, 102' comprises destination information of the WQE 102, 102', wherein the destination information comprises at least one of: an address of a receiving device 200, an identifier of a receiving device 200, and an identifier of a target application of the receiving device 200. The method 900 further comprises a step 902 of assigning each of the one or more WQEs 102, 102' with an XID, and translate each WQE 102, 102' into a packet 103, 103'. In particular, each packet 103, 103' comprises the XID of the corresponding WQE 102, 102' and is associated with a PSN. The method 900 further comprises a step 903 of transmitting each packet 103, 103' to the receiving device (200, 200') of the destination information of the WQE 102, 102'. The method 900 further comprises a step 904 of receiving a notification message 201 for each transmitted packet 103 from the receiving device 200, wherein the notification message 201 indicates whether the transmitted packet 103 is received at the receiving device 200. Further, the method 900 comprises a step 905 of determining whether or not to generate a completion for each WQE 102, based on the notification message 201, on information carried in the WQE 102 and information held by the transmitting device 100.

Figure 10:
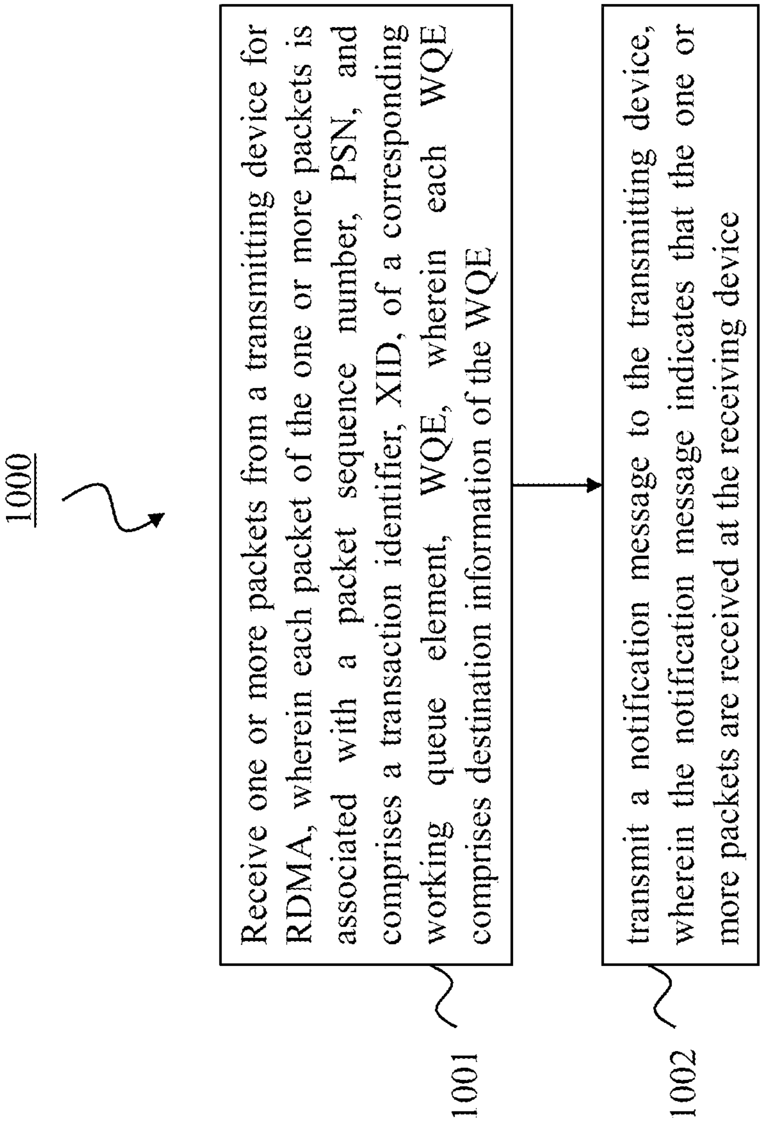
FIG. 10 shows a method for RDMA according to another embodiment of the present disclosure.

FIG. 10 shows a method 1000 for RDMA according to an embodiment of the disclosure. In a particular embodiment of the disclosure, the method 1000 is performed by a receiving device 200 shown in FIG. 1 or FIG. 8. The method 1000 comprises a step 1001 of receiving one or more packets 103 from a transmitting device 100 for RDMA. In particular, each packet 103 of the one or more packets 103 is associated with a PSN, and comprises an XID of a corresponding WQE 102. Each WQE 102 comprises destination information of the WQE 102, wherein the destination information comprises at least one of: an address of the receiving device 200, an identifier of the receiving device 200, and an identifier of a target application of the receiving device 200. The method 1000 further comprises a step 1002 of transmitting a notification message 201 to the transmitting device 100, wherein the notification message 201 indicates that the one or more packets are received and/or processed at the receiving device 200.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

Furthermore, any method according to embodiments of the disclosure may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the transmitting device 100, or the receiving device 200, comprises the useful communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, trellis-coded modulation (TCM) encoder, TCM decoder, power supply units, power feeders, communication interfaces, communication protocols, etc. which are suitably arranged together for performing the solution.

Especially, the processor(s) of the transmitting device 100, or the receiving device 200, may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

What is claimed is:

1. A transmitting device for Remote Direct Memory Access (RDMA), wherein the transmitting device comprises:

a memory configured to store instructions; and a processor coupled to the memory and configured to execute the instructions to cause the transmitting device to:

maintain a send queue, wherein the send queue comprises one or more working queue elements (WQEs), wherein each WQE comprises destination information of the WQE, wherein the destination information comprises at least one of: an address of a receiving device, an identifier of the receiving device, and an identifier of a target application of the receiving device;

assign each of the one or more WQEs with a transaction identifier (XID), and translate each WQE into a respective packet, wherein each respective packet comprises the XID of the corresponding WQE and is associated with a packet sequence number (PSN);

transmit each packet to the receiving device of the destination information of the WQE;

receive a notification message for each transmitted packet from the receiving device, wherein the notification message indicates whether the transmitted packet is received at the receiving device; and based on the notification message, determine whether or not to generate a completion for each WQE on information carried in the WQE and information held by the transmitting device.

2. The transmitting device according to claim 1, wherein each WQE carries a message that is limited to fit in a single maximum transfer unit (MTU) of a network via which packets are transmitted between the transmitting device and the receiving device.

3. The transmitting device according to claim 1, wherein based on the WQE corresponding to a respective packet comprising a Write operation request or a Send operation request, and based on the notification message indicating that the respective packet is received at the receiving device, the processor is further configured to execute the instructions to cause the transmitting device to:

determine that the WQE is completed successfully.

4. The transmitting device according to claim 1, wherein based on the WQE corresponding to a respective packet comprising a Read operation request or an Atomic operation request, the processor is further configured to execute the instructions to cause the transmitting device to:

receive, as an Atomic operation response or a Read operation response to the Atomic operation request or the Read operation request, respectively, a response packet indicating that the respective packet has been processed by the receiving device, wherein the response packet comprises an XID of a response WQE and the XID of the WQE that comprises the Read operation request or the Atomic operation request; and determine that the WQE is completed successfully.

5. The transmitting device according to claim 1, wherein the processor is further configured to execute the instructions to cause the transmitting device to:

obtain a maximum number of acceptable receive timeout that is associated with the receiving device; and determine that the WQE corresponding to the respective packet is completed with error, based on a number of receive timeouts exceeding the maximum number of acceptable receive timeout.

6. The transmitting device according to claim 1, wherein the notification message for each transmitted packet comprises a receiver not ready (RNR) indication, wherein the RNR indication indicates that the receiving device cannot process the transmitted packet, wherein the processor is further configured to execute the instructions to cause the transmitting device to:

determine an XID comprised in the transmitted packet; and postpone transmitting another packet comprising the same XID before a timeout value expires.

7. The transmitting device according to claim 6, wherein the WQE further includes a parameter indicating a maximum number of acceptable RNR indications, wherein the processor is further configured to execute the instructions to cause the transmitting device to receive a further notification message that comprises an RNR indication for the retransmitted packet; and determine that the WQE corresponding to the retransmitted packet is completed with error, based on a number of received RNR indications exceeding the maximum number of acceptable RNR indications.

8. The transmitting device according to claim 6, wherein the notification message comprises a plurality of RNR indications, each RNR indication indicating that the receiving device cannot process a particular transmitted packet.

9. The transmitting device according to claim 8, wherein each RNR indication further indicates that the receiving device cannot process a particular transmitted packet within a particular timeout value.

10. The transmitting device according to claim 9, configured to:

manage WQEs corresponding to transmitted packets for which an RNR indication is received, based on the timeout values indicated by the RNR indications.

11. The transmitting device according to claim 10, wherein a number of supported timeout values are configurable and agreed upon all communication devices.

12. The transmitting device according to claim 6, wherein the RNR indication further indicates the timeout value.

13. The transmitting device according to claim 1, wherein the one or more WQEs of the send queue comprises a first WQE and a second WQE, wherein the first WQE and the second WQE comprise different destination information.

14. The transmitting device according to claim 1, wherein the one or more WQEs of the send queue comprises a set of WQEs comprising the same destination information, and wherein the processor is further configured to execute the instructions to cause the transmitting device to:

group the packets corresponding to the set of WQEs into a stream of packets; and transmit the stream of packets to the receiving device of the set of WQEs.

15. The transmitting device according to claim 1, wherein the one or more WQEs are a plurality of WQEs obtained from a plurality of upper layer processes (ULPs), and wherein the plurality of WQEs comprises at least two WQEs that comprise different destination information.

16. The transmitting device according to claim 15, wherein each WQE is further associated with a priority for being transmitted from the transmitting device.

17. The transmitting device according to claim 16, wherein the priority of each WQE is determined based on the ULP from which that WQE is obtained.

18. The transmitting device according to claim 15, wherein the plurality of WQEs comprises at least two WQEs having the same destination information and obtained from different ULPs.

19. The transmitting device according to claim 15, wherein XIDs for WQEs obtained from different ULPs are assigned from a same XID pool, and PSNs for packets associated with the WQEs obtained from different ULPs are assigned from a same PSN pool.

20. The transmitting device according to claim 1, wherein each packet is further associated with a flowlet ID identifying a flowlet, wherein the flowlet comprises a plurality of packets, and the packet corresponding to the WQE further comprises the flowlet ID.

21. The transmitting device according to claim 20, wherein the processor is further configured to execute the instructions to cause the transmitting device to:

transmit each packet to the receiving device via the flowlet, wherein the flowlet is associated with the receiving device.

22. A receiving device for Remote Direct Memory Access (RDMA), wherein the receiving device comprises:

a memory configured to store instructions; and a processor coupled to the memory and configured to execute the instructions to cause the receiving device to:

receive one or more packets from a transmitting device for RDMA, wherein each packet of the one or more packets is associated with a packet sequence number (PSN) and comprises a transaction identifier (XID) of a corresponding working queue element (WQE), wherein the WQE comprises destination information, wherein the destination information comprises at least one of: an address of the receiving device, an identifier of the receiving device, and an identifier of a target application of the receiving device; and transmit a notification message to the transmitting device, wherein the notification message indicates that the one or more packets are received at the receiving device.

23. The receiving device according to claim 22, wherein based on the WQE corresponding to a respective packet comprising a Write operation request or a Send operation request, the processor is further configured to execute the instructions to cause the receiving device to:

place data, which is carried on the Write operation request, into a destination memory location in the receiving device; or place data, which is carried on the Send operation request, into a buffer from a receive queue of the receiving device.

24. The receiving device according to claim 22, wherein based on the WQE corresponding to a respective packet comprising a Read operation request or an ATOMIC operation request, the processor is further configured to execute the instructions to cause the receiving device to:

transmit a response packet indicating that the respective packet has been processed by the receiving device, to the transmitting device.

25. The receiving device according to claim 24, wherein the processor is further configured to execute the instructions to cause the receiving device to:

create a response WQE according to the Read operation request or the ATOMIC operation request;

assign the response WQE with an XID and translate the response WQE into the response packet, wherein the response packet comprises the XID of the response WQE and the XID of the WQE that comprises the Read operation request or the Atomic operation request.

26. The receiving device according to claim 24, wherein the processor is further configured to execute the instructions to cause the receiving device to:

generate a receiver not ready (RNR) indication for a received packet, based on the receiving device being not able to process the respective packet, wherein the notification message for the respective packet further comprises the RNR indication indicating the transmitting device that the receiving device cannot process the respective packet.

27. The receiving device according to claim 26, wherein the RNR indication further indicates a preset timeout value, wherein the RNR indication indicates that the receiving device cannot process the respective packet within the preset timeout value.

28. The receiving device according to claim 26, wherein the notification message comprises a plurality of RNR indications, each RNR indication indicating that the receiving device cannot process a particular transmitted packet.

29. The receiving device according to claim 22, wherein the one or more packets comprise a first packet and a second packet, wherein a PSN of the first packet is smaller than a PSN of the second packet, and wherein the processor is further configured to execute the instructions to cause the receiving device to:

transmit the notification message for the first packet and the notification message for the second packet out-of-order; and/or process the first packet and the second packet out-of-order; and transmit the response message for the first packet and the response message for the second packet to the transmitting device out-of-order.

30. The receiving device according to claim 22, wherein the processor is further configured to execute the instructions to cause the receiving device to:

maintain a database storing XIDs of WQEs that are received at the receiving device.

31. The receiving device according to claim 30, wherein the processor is further configured to execute the instructions to cause the receiving device to:

determine for each received packet whether it is a duplicated packet, by checking whether a XID of WQE comprised in the received packet has been stored in the database; and ignore any duplicated packet.

32. The receiving device according to claim 30, wherein the database further comprises a state of each WQE that indicates whether the WQE has been processed.

33. A method for Remote Direct Memory Access (RDMA) applied to a transmitting device, wherein the method comprises:

maintaining a send queue, wherein the send queue comprises one or more working queue elements (WQEs), wherein each WQE comprises destination information of the WQE, wherein the destination information comprises at least one of: an address of a receiving device, an identifier of a receiving device, and an identifier of a target application of a receiving device;

assigning each of the one or more WQEs with a transaction identifier (XID), and translate each WQE into a respective packet, wherein each respective packet comprises the XID of the corresponding WQE and is associated with a packet sequence number (PSN);

transmitting each packet to the receiving device of the destination information of the WQE;

receiving a notification message for each transmitted packet from the receiving device, wherein the notification message indicates whether the transmitted packet is received at the receiving device; and based on the notification message, determining whether or not to generate a completion for each WQE on information carried in the WQE and information held by the transmitting device.

34. A computer program product comprising a non-transitory computer readable medium for storing processor executable instructions which, upon being executed by a processor, cause the processor to perform the method of claim 33.

35. A method for Remote Direct Memory Access (RDMA) applied to a receiving device, wherein the method comprises:

receiving one or more packets from a transmitting device for RDMA, wherein each packet of the one or more packets is associated with a packet sequence number (PSN), and comprises a transaction identifier (XID) of a corresponding working queue element (WQE), wherein each WQE comprises destination information of the WQE, wherein the destination information comprises at least one of: an address of the receiving device, an identifier of the receiving device, and an identifier of a target application of the receiving device; and transmitting a notification message to the transmitting device, wherein the notification message indicates that the one or more packets are received and/or processed at the receiving device.

* * * * *